United States Patent
Kataria et al.

(10) Patent No.: US 11,379,385 B2
(45) Date of Patent: Jul. 5, 2022

(54) TECHNIQUES FOR PROTECTING MEMORY PAGES OF A VIRTUAL COMPUTING INSTANCE

(71) Applicant: VMWARE, INC., Palo Alto, CA (US)

(72) Inventors: Alok Nemchand Kataria, Pune (IN); Wei Xu, Palo Alto, CA (US); Radu Rugina, Palo Alto, CA (US); Jeffrey W. Sheldon, Palo Alto, CA (US); James S. Mattson, Seattle, WA (US); Rakesh Agarwal, Palo Alto, CA (US); David Dunn, Bellevue, WA (US)

(73) Assignee: VMware, Inc., Palo Alto, CA (US)

( * ) Notice: Subject to any disclaimer, the term of this patent is extended or adjusted under 35 U.S.C. 154(b) by 959 days.

(21) Appl. No.: 15/444,350

(22) Filed: Feb. 28, 2017

(65) Prior Publication Data

US 2017/0300430 A1    Oct. 19, 2017

(30) Foreign Application Priority Data

Apr. 16, 2016  (IN) .............................. 201641013312

(51) Int. Cl.
*G06F 12/14*  (2006.01)
*G06F 21/50*  (2013.01)
(Continued)

(52) U.S. Cl.
CPC ...... *G06F 12/1458* (2013.01); *G06F 9/45558* (2013.01); *G06F 9/468* (2013.01);
(Continued)

(58) Field of Classification Search
CPC ....... G06F 9/45558; G06F 2009/45583; G06F 2009/45587; G06F 2212/152;
(Continued)

(56) References Cited

U.S. PATENT DOCUMENTS 6,053,948 A    4/2000 Vaidyanathan et al.
7,111,145 B1   9/2006 Chen et al.
(Continued)

OTHER PUBLICATIONS

Lutas et al. (U-HIPE: hypervisor-based protection of user-mode processes in Windows, Published online: Feb. 4, 2015, 14 pages) (Year: 2015).*

(Continued)

*Primary Examiner* — Oleg Korsak
*Assistant Examiner* — Feliciano S Mejia
(74) *Attorney, Agent, or Firm* — Patterson + Sheridan, LLP (57) ABSTRACT

Mechanisms to protect the integrity of memory of a virtual machine are provided. The mechanisms involve utilizing certain capabilities of the hypervisor underlying the virtual machine to monitor writes to memory pages of the virtual machine. A guest integrity driver communicates with the hypervisor to request such functionality. Additional protections are provided for protecting the guest integrity driver and associated data, as well as for preventing use of these mechanisms by malicious software. These additional protections include an elevated execution mode, termed "integrity mode," which can only be entered from a specified entry point, as well as protections on the memory pages that store the guest integrity driver and associated data.

20 Claims, 6 Drawing Sheets (51) Int. Cl.
*G06F 9/455* (2018.01)
*G06F 9/46* (2006.01)
*G06F 21/74* (2013.01)

(52) U.S. Cl.
CPC .............. *G06F 21/50* (2013.01); *G06F 21/74* (2013.01); *G06F 2009/45583* (2013.01); *G06F 2009/45587* (2013.01); *G06F 2212/1052* (2013.01); *G06F 2212/152* (2013.01)

(58) Field of Classification Search
CPC .. G06F 2212/1052; G06F 21/53; G06F 21/57; G06F 21/50; G06F 21/74; G06F 21/575; G06F 9/468; G06F 9/45533; G06F 12/08; G06F 21/554; G06F 21/566; G06F 9/45545; G06F 12/1458
USPC .................. 713/193; 726/24, 26–27 and, 30
See application file for complete search history.

(56) References Cited

U.S. PATENT DOCUMENTS

| | | | |
|---|---|---|---|
| 7,596,654 B1 | 9/2009 | Wong | |
| 7,882,318 B2* | 2/2011 | Savagaonkar | G06F 12/145 |
| | | | 711/163 |
| 8,578,080 B2 | 11/2013 | Sahita et al. | |
| 8,799,879 B2* | 8/2014 | Wright | G06F 9/45516 |
| | | | 717/136 |
| 9,038,176 B2* | 5/2015 | Sallam | G06F 21/554 |
| | | | 718/1 |
| 9,129,106 B2 | 9/2015 | Sharif et al. | |
| 9,195,518 B1 | 11/2015 | Larsen et al. | |
| 9,256,552 B2* | 2/2016 | Epstein | G06F 11/1469 |
| 9,292,328 B2 | 3/2016 | Pratt et al. | |
| 9,384,142 B2 | 7/2016 | Pease et al. | |
| 9,405,570 B2 | 8/2016 | Sahita et al. | |
| 9,753,867 B2 | 9/2017 | Hashimoto et al. | |
| 9,846,610 B2 | 12/2017 | Tsirkin | |
| 10,073,986 B2* | 9/2018 | Vipat | G06F 21/566 |
| 10,176,095 B2* | 1/2019 | Ferguson | H04L 63/0823 |
| 10,216,927 B1* | 2/2019 | Steinberg | G06F 9/45558 |
| 10,324,863 B2* | 6/2019 | Lemay | G06F 21/70 |
| 2004/0177261 A1* | 9/2004 | Watt | G06F 21/79 |
| | | | 713/193 |
| 2004/0230583 A1 | 11/2004 | Testa | |
| 2006/0259818 A1 | 11/2006 | Howell et al. | |
| 2007/0055837 A1* | 3/2007 | Rajagopal | G06F 12/1475 |
| | | | 711/163 |
| 2008/0005447 A1 | 1/2008 | Schoenberg et al. | |
| 2008/0040565 A1 | 2/2008 | Rozas et al. | |
| 2008/0134322 A1* | 6/2008 | Chauvel | G06F 9/4812 |
| | | | 726/21 |
| 2008/0271014 A1 | 10/2008 | Serebrin et al. | |
| 2009/0037936 A1 | 2/2009 | Serebrin | |
| 2009/0113110 A1* | 4/2009 | Chen | G06F 9/45558 |
| | | | 718/1 |
| 2009/0217098 A1 | 8/2009 | Farrell et al. | |
| 2010/0070678 A1 | 3/2010 | Zhang et al. | |
| 2010/0281273 A1 | 11/2010 | Lee et al. | |
| 2010/0299665 A1 | 11/2010 | Adams | |
| 2011/0047543 A1 | 2/2011 | Mohinder | |
| 2011/0231630 A1 | 9/2011 | Dannowski et al. | |
| 2014/0149464 A1 | 5/2014 | Kahle et al. | |
| 2015/0013008 A1 | 1/2015 | Lukacs et al. | |
| 2015/0178497 A1 | 6/2015 | Lukacs et al. | |
| 2016/0147993 A1 | 5/2016 | Xu et al. | |
| 2016/0371496 A1 | 12/2016 | Sell | |
| 2017/0228271 A1 | 8/2017 | Tsirkin | |
| 2017/0286673 A1* | 10/2017 | Lukacs | G06F 21/554 |
| 2017/0337000 A1 | 11/2017 | Dunn et al. | |
| 2017/0337011 A1 | 11/2017 | Xu et al. | |
| 2017/0371733 A1 | 12/2017 | Rugina et al. | |
| 2018/0074903 A1 | 3/2018 | Leggette et al. | |

OTHER PUBLICATIONS

International Search Report and Written Opinion dated Jun. 29, 2017, mailed in counterpart International Application No. PCT/US2017/027462, 11 pages.

Office Action dated Mar. 22, 2018 in U.S. Appl. No. 15/256,779, 19 pages.

* cited by examiner

TECHNIQUES FOR PROTECTING MEMORY PAGES OF A VIRTUAL COMPUTING INSTANCE

RELATED APPLICATION

Benefit is claimed under 35 U.S.C. 119(a)-(d) to Foreign Application Serial No. 201641013312 filed in India entitled "TECHNIQUES FOR PROTECTING MEMORY PAGES OF A VIRTUAL COMPUTING INSTANCE", filed on Apr. 16, 2016, by VMware, Inc., which is herein incorporated in its entirety by reference for all purposes.

BACKGROUND

Virtual machine (VM) systems provide a guest operating system (OS) with a virtual execution platform comprising virtual hardware subsystems configured to emulate corresponding physical hardware subsystems. An instance of the virtual execution platform configured to execute the guest OS is commonly referred to as a virtual machine (VM). In a typical VM system, an arbitrary number of VMs may execute on a single physical host machine (or more simply, "host"). Each VM may operate independently with respect to other VMs and may communicate with the other VMs, for example via an emulated network interface. The host, through a virtualization software (e.g., hypervisor) running therein, should be configured with adequate computational and memory resources to support the VMs.

As in physical machines, security measures are implemented in VMs to combat malicious activity, such as corrupting memory or accessing privileged information. VM integrity tools, implemented in VMs as guest drivers, may be used to inspect the contents of the VM in real-time. These tools, as described in U.S. application Ser. No. 13/430,868 and U.S. application Ser. No. 14/550,881, both of which are incorporated by reference herein, monitor events within the VM, and selectively report system events to various service appliances, such as a security service appliance configured with anti-virus and anti-malware scanning software.

As such, guest integrity drivers are key components in the VM's security framework and need to be shielded from kernel-level attacks or malicious programs, such as root kits. The possible root kit attack vectors include attempts to unload the driver or prevent the driver from loading, tampering with the driver code or data that are on disk or in memory, and tampering with the communication channel of the driver.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

According to one or more embodiments, mechanisms to protect a special driver, herein after referred to as a guest integrity ("GU") driver, executing in a virtual machine are provided. The GI driver performs certain operations for protecting the integrity of the virtual machine—also referred to as a "guest." More specifically, the GI driver is implemented in the guest to define memory pages of the VM to be protected. Such protection involves the GI driver requesting that a hypervisor monitor such pages and also requesting to be notified when such pages are written to. Because of the importance of the GI driver, the integrity of the GI driver should be protected. In order to protect the integrity of the GI driver, the GI driver executes in a privileged mode, termed "integrity mode." Requests for protection of the guest, made from the GI driver to the hypervisor, can only be executed in integrity mode. Integrity mode prevents malicious code from masquerading as the GI driver and interfering with the guest protection mechanisms by, for example, changing the memory pages being monitored by the hypervisor.

Integrity mode can only be entered from a pre-specified "entry point," which, in various embodiments, comprises a specific instruction pointer address or a combination of instruction pointer address and virtual central processing unit (vCPU) identifier. In order for the entry point, itself, to be trusted, the GI driver provides an indication of this entry point early on in the guest operating system boot process. Some operating systems, such as Microsoft Windows, provide a window of time, early in the boot-up process, in which to execute security software. By providing this window early in the boot process, the operating system provides a level of certainty that no malicious software has tampered with the operating system or with the GI driver. Additionally, software executed during this period of time is required to be certified by the operating system developer, thus ensuring that such software is not malicious. Defining the entry point for integrity mode during this early period thus provides some certainty that no malicious software has somehow interfered with the mechanism for entering integrity mode, such as by "hijacking" the mechanism for setting the entry point.

Other techniques for protecting the integrity of the GI driver are also provided herein. For example, the GI driver requests protection of the memory pages storing instructions and data for the GI driver, itself. Thus, the GI driver will receive notifications from the hypervisor if malicious software tampers with either the GI driver code or data. Additional protections are provided below.

Figure 1:
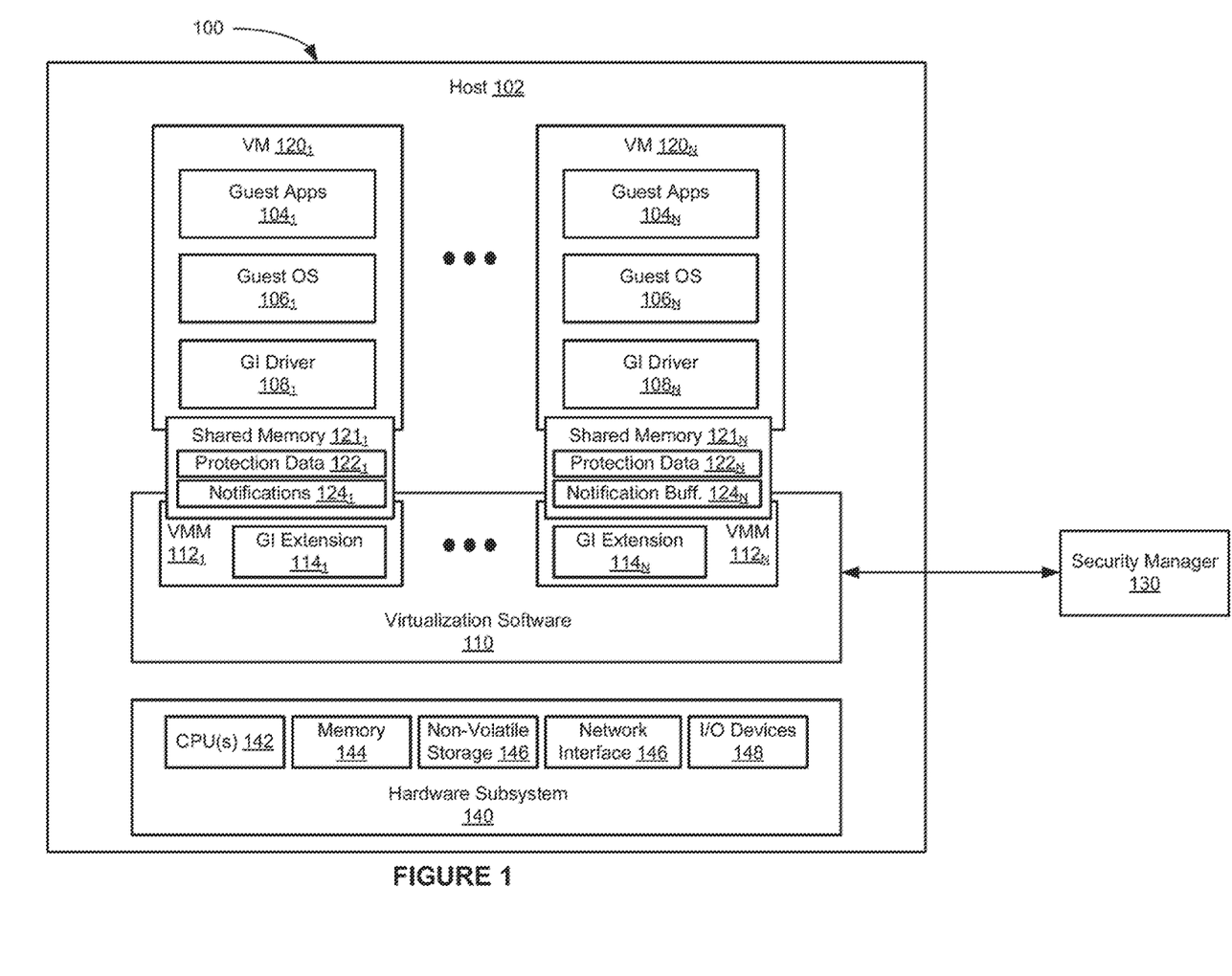
FIG. 1 is a block diagram of a memory protection system, according to embodiments.

FIG. 1 is a block diagram of a host 102 that implements a guest integrity platform according to embodiments. Host 102 includes a hardware computing platform and may be a desktop computer, laptop computer, tablet computer, mobile device such as a smart phone, or server grade computer. The hardware computing platform may be based on different variations of the well-known x86 architecture platforms (or on other available platforms). Host 102 is configured to execute virtualization software 110 that provides execution support for one or more virtualized execution contexts, examples of which include guest virtual machines (VMs) 120.

Each VM 120 may be assigned by virtualization software 110 one or more virtual central processing units ("vCPUs"). VCPUs are virtual versions of physical CPUs and allow VMs 120 to act as multi-CPU machines. Each vCPU is seen as a single physical CPU core by guest OS 106, which can assign different tasks to different vCPUs. Software (e.g., guest apps 104) that is configured to execute on multiple physical CPUs can execute on multiple vCPUs in a virtualized environment.

Each VM 120 executes in an independent context, and virtualization software 110 executes in a more privileged context to support the activities of the VMs 120. Virtualization software 110 may be implemented to include a kernel with hardware drivers for managing hardware subsystem 140 of host 102. In one embodiment, virtualization software 110 comprises a host operating system configured to provide system services to VMs 120. In other embodiments, virtualization software 110 comprises a hypervisor configured to provide system services to VMs 120. The hardware subsystem 140 includes computational resources including one or more processing units (e.g., CPUs 142), system memory 144 (referred to herein as "host physical memory," which is 202 in FIG. 2), mass storage (e.g., non-volatile storage 146), a networking interface 147, and input/output devices 148, which include, for example, keyboard, display, and the like.

As shown, virtualization software 110 includes virtual machine monitors (VMMs) 112, which operate in the privileged context of virtualization software 110 and provide the virtual system support, such as emulated physical devices (e.g., virtual CPUs and virtual system memory), for their respective VMs. In alternative embodiments, there may be one VMM for a plurality of VMs.

Each VM 120 is configured to execute a guest operating system (OS) 106, which may be a commodity operating system, such as Microsoft Windows® operating system or Linux® operating system. Each VM 120 is further configured to support guest applications (apps) 104 and includes a guest integrity (GI) driver 108, described in detail below, which cooperates with virtualization software 110, to provide functionality for defining what memory pages of the VM to protect and detecting writes to the protected pages. Each VM 120 also includes shared memory 121, which stores data for operation of GI driver 108 and GI extension 114. Shared memory 121 is considered to be shared because, although configured as guest memory, shared memory 121 is also accessed by VMM 112.

Protection data 122 includes data that identifies the pages that GI driver 108 has requested GI extension 114 to monitor, and defines what actions to take when each such pages are written to. Such actions are referred to herein as "alert actions." Notification buffer 124 includes notifications from GI extension 114 for notifying guest integrity driver 108 that a violation event, such as a write to a particular protected memory page, has occurred. Notification buffer 124 may be implemented as a ring buffer.

Security manager 130 receives messages from GI extension 114 regarding events (such as writes) related to protected pages. Security manager 130 may be implemented as a virtual machine or as a physical computer system that includes computing components such as a processor, memory, non-volatile storage, networking components, and the like, configured to perform the functionality described herein.

The various terms, layers and categorizations used to describe the virtualization components in FIG. 1 may be referred to differently without departing from their functionality or the spirit or scope of the invention. One example of VMM 112 that may be used is a hypervisor included as a component of VMware's vSphere® product, which is commercially available from VMware, Inc. of Palo Alto, Calif.

Figure 2:
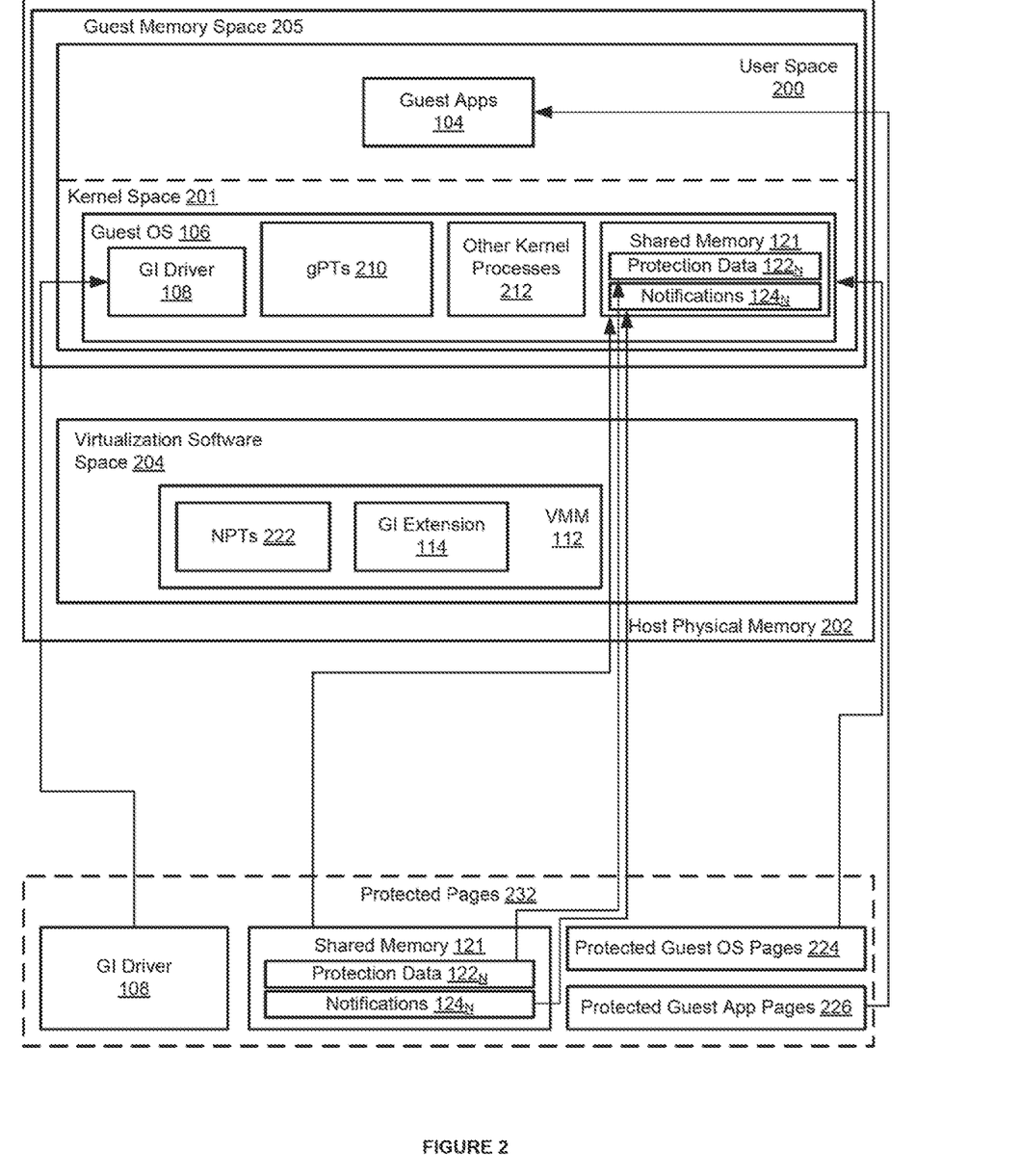
FIG. 2 is a block diagram that illustrates aspects of FIG. 1 in greater detail, according to embodiments.

FIG. 2 is a block diagram that illustrates protected memory pages 232 of a VM that are protected by a GI driver 108 working in cooperation with a GI extension 114, according to embodiments. FIG. 2 also shows the context of those protected memory pages, by illustrating the location of various software modules and data structures associated with operation of the VM and with operation of a virtual machine manager 112 that supports the VM.

Protected memory pages 232 include GI driver 108. Thus, the pages that store the instructions that comprise GI driver 108 are considered to be "protected." These pages are protected so that, in the event malicious code attempts to tamper with the instructions that comprise GI driver 108, GI extension 114 will perform an appropriate alert action. Malicious code may attempt to tamper with GI driver 108 in various ways including modifying GI driver 108 to cause GI driver 108 to request to GI extension 114 that certain memory pages that are protected no longer be protected.

Protected memory pages 232 also include pages of shared memory 121, which include pages that specify protection data 122 and page of the notification buffer 124. Pages of protection data 122 contain information that specifies what memory pages are protected, and "alert information," which define the current set of alert actions. Alert actions are specified in protection data 122 as a selection of zero or more pre-defined actions that may be taken in the event of a violation, such as a write to a protected memory page. In some embodiments, the alert information may specify zero or more of the following actions to be taken in the event of a violation: suspending a VM, sending a message to security manager 130, and writing a notification into notification buffer 124 for consumption by GI driver 108. In some embodiments, the alert information may also specify that the write be blocked. The entries within notification buffer 124 are messages from GI extension 114 to GI driver 108 regarding violations that have occurred.

Protected memory pages 232 also include protected guest OS pages 224 and protected guest app pages 226. Protected guest OS pages 224 comprise certain pages of guest OS 106 for which protection is desired. Protected guest OS pages 224 may include certain "critical" memory pages of guest OS 224 that some entity, such as the developer of GI driver 108, has determined to be critical to the functioning of guest OS 106 and thus in need of protection. Similarly, protected guest app pages 226 comprise pages of guest apps that some entity, such as the developer of GI driver 108 has determined to be critical to the functioning of one or more of the guest apps 104. The specific pages included within protected guest OS pages 224 and protected guest app pages 226 may of course vary by the software configuration of the associated VM.

Protection data 122 may specify any combination of the following alert actions, including none, to take, in response to a protected page being written to: post a notification (also referred to as a "violation event" herein) to notification buffer 124 indicating that the page has been written to, send a predefined message to the security manager 130, and suspend the VM whose page has been written to. In some embodiments, protection data 122 may also specify that the write be blocked. The predefined message that is to be sent to the security manager 130 may be stored in protection data 122.

In order to contrast protected pages 232 with non-protected pages of a VM and VMM 112, various elements, including the elements within protected pages 232, and other, non-protected elements, are shown within host physical memory 202. To provide an understanding of the logical relationship of various elements stored in host physical memory 202, a description of the memory addressing scheme implemented by host computer 102 is now provided.

Host 102 implements second level address translation scheme, which is a scheme whereby the host hardware (e.g., processor and memory management unit ("MMU")) is aware of two levels of page tables that define mappings between guest virtual and guest physical memory as well as mappings between guest physical memory and host physical memory. Guest OS 106 maintains guest virtual-to-guest physical mappings ("gV→gP mappings") within guest page tables ("gPTs") 210. As in physical computer systems, the guest page tables are provided per process in the embodiments. The second type of mappings, labeled as gP→hP mappings, are mappings from the guest physical memory space to the host physical memory space. The gP→hP mapping is managed by VMM 112, and is encoded in nested page tables 222 (NPTs) (also known as "extended page tables"). Conventionally, one set of nested page tables is provided per VM.

Host physical memory 202 is divided into guest memory space 205 and virtualization software space 204. Guest memory space 205 comprises memory assigned to a VM 120 and is divided into user space 200 and kernel space 201. User space 200 comprises memory spaces presented by guest OS 106 to software such as guest apps 104. User space 200 is addressed by guest apps 104 via guest virtual memory addresses. Kernel space 201 comprises memory spaces allocated to guest OS 106 and stores various elements such as GI driver 108, gPTs 210, other kernel processes 212 (that is, kernel processes other than the GI driver 108), and protection data 122. Guest apps 104 typically access memory via guest virtual memory addresses, while guest OS 106 has the ability to "see" both guest virtual memory addresses and guest physical memory addresses. Virtualization software space 204 comprises portions of host physical memory 202 that are outside of guest memory space 205 and that are allocated for use by virtualization software 110. VMM 112 has the ability to "see" host physical memory addresses and guest physical memory addresses.

Other portions of host physical memory 202 that are not shown in FIG. 2 may be free or used to map host physical memory required by other VMs or processes running in host 102. It should be recognized that the boxes depicting the various memory spaces and elements are for illustrative purposes only, and that these boxes may be of any size and need not be contiguous in the host physical memory space.

Of the elements in kernel space 201, all of GI driver 108 and all of shared memory 121 are included within protected pages 232. The box labeled "other kernel processes 212" includes all software that comprises guest OS 106 other than GI driver 108 and shared memory 121. Only the portions of guest OS 106 for which protection is explicitly requested by GI driver 108 are protected. Thus, other kernel processes 212 includes some protected memory pages, which are shown as protected guest OS pages 224, and some non-protected memory pages. Guest page tables 210 may include some mappings that are protected. To protect mappings in guest page tables 210, GI driver 108 requests VMM 112 protect particular mappings. VMM 112 stores an indication of protected mappings and at various points in time checks the stored indications against the current mappings to determine whether the mappings have changed. Similarly, some of the memory pages of guest apps 104 are protected. These memory pages are indicated as protected guest app pages 226. Guest apps 104 also include some memory pages that are not protected and thus not included within protected pages 232. Memory within virtualization software space 204 is not accessible to software executing within guest memory space 205, and thus no pages within virtualization software space 204 are protected according to embodiments.

To prevent malicious code from hijacking the mechanism for requesting protection of memory pages, requests to protect memory pages will only be executed by extension 114 if executed from an elevated privilege mode referred to herein as "integrity mode." Only GI driver 108 may enter integrity mode. To prevent malicious code from entering integrity mode, GI driver 108 initializes integrity mode by specifying an integrity mode entry point. Integrity mode can only be entered via a specific request that is executed from the pre-specified entry point.

Figure 3:
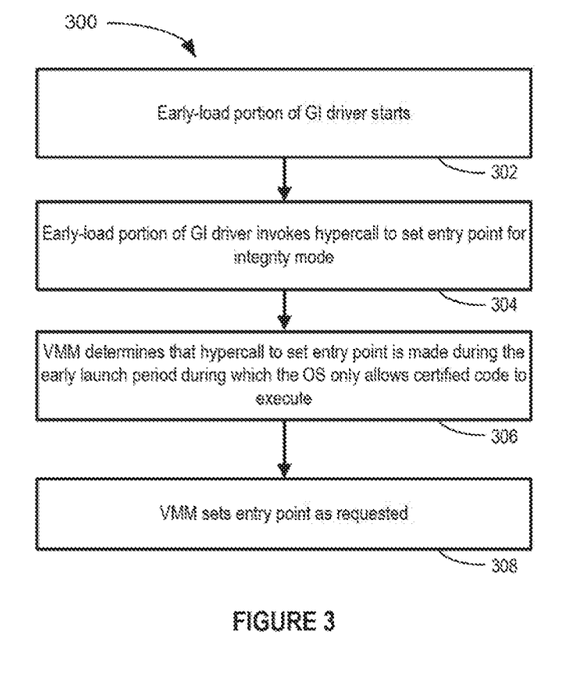
FIG. 3 is a flow diagram of a method for initializing integrity mode for a guest integrity driver, according to an embodiment.

FIG. 3 is a flow diagram of a method 300 for initializing integrity mode for a guest integrity driver, according to an embodiment. Although described with respect to the system of FIGS. 1 and 2, those of skill in the art will recognize that any system that performs the steps of method 300, in various alternative technically feasible orders, falls within the scope of the present disclosure.

As shown, method 300 begins at step 302, where guest OS 106 starts an early-load portion of GI driver 108. The early-load portion of GI driver 108 executes within a time period during the boot process that is specifically provided by guest OS 106 for security purposes. For example, the Microsoft Windows operating system provides an early-launch anti-malware mechanism that loads certain specific drivers at an early time during operating system boot-up. The early time at which such drivers execute provides a level of protection against tampering, because other software, such as malicious code, simply has not yet had an opportunity to execute. Additionally, in some embodiments, the early-load portion of GI driver 108 is pre-certified by the developer of guest OS 106, so that guest OS 106 recognizes the early-load portion of GI driver 108 as "safe" and not including malicious code.

At step 304, the early-load portion of GI driver 108 invokes a hypercall to set an entry point for entering integrity mode. Hypercalls are requests from virtual machines to VMM 112, asking for specific functionality to be performed. At step 306, GI extension 114 in VMM 112 responds to the hypercall invocation and determines that an entry point for entering integrity mode has not yet been set. Although the early-load portion of GI driver 108 is not executing in integrity mode, the early-load portion of GI driver 108 can be trusted because it has been certified and the security assurances guaranteed by OS 106 for code executing during the early-launch period. On the other hand, if GI driver 108 needs to change the entry point for integrity mode at some time after the early-launch period, then GI driver 108 must first enter integrity mode. Integrity mode is required to change the entry point after the entry point has initially been set in order to prevent malicious code from "hijacking" the ability to enter integrity mode by changing the entry point to an address to which the malicious code has access.

At 308, GI extension 114 in VMM 112 sets the entry point for hypercalls to enter integrity mode. The entry point includes an instruction pointer address and may also, in some embodiments, include a specific virtual CPU ("vCPU") identification. Including a vCPU identification in the entry point provides further specificity, to the entry point, which provides further assurance that only the GI driver 108 is able to enter integrity mode. After this entry point is set, GI extension 114 will ignore hypercalls to enter integrity mode unless such hypercalls are made from the instruction address specified by the entry point as well as the vCPU specified by the entry point in embodiments in which the entry point specifies a particular vCPU.

Figure 4:
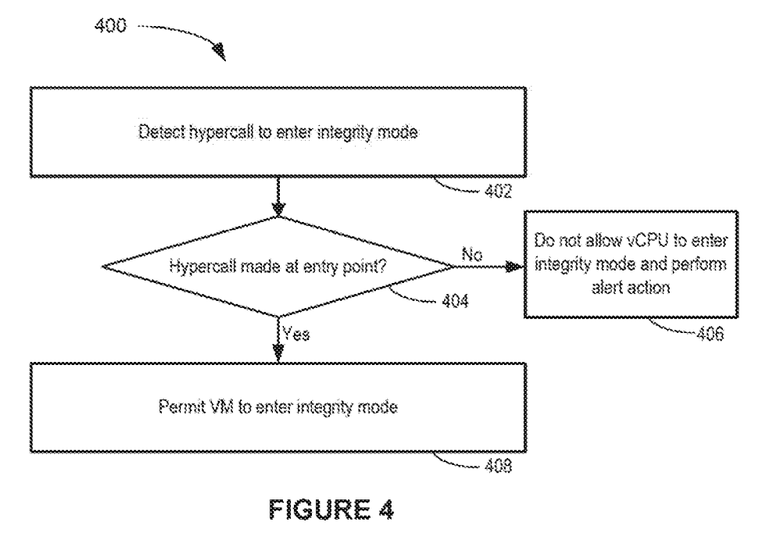
FIG. 4 is a flow diagram of a method for entering integrity mode, according to an embodiment.

With integrity mode initialized and an entry point set, GI driver 108 is able to enter integrity mode by invoking the appropriate hypercall. FIG. 4 is a flow diagram of a method 400 for entering integrity mode, according to an embodiment. Although described with respect to the system of FIGS. 1 and 2, those of skill in the art will recognize that any system that performs the steps a method 400, in various alternative technically feasible orders, falls within the scope of the present disclosure.

As shown, method 400 begins at step 402, where GI extension 114 detects a hypercall to enter integrity mode. This hypercall is intended to be called by GI driver 108 to allow the VM and vCPU on which GI driver 108 is executing to enter integrity mode, and in normal operation. GI driver 108 invokes this hypercall to enter integrity mode so that GI driver 108 can perform other functionality associated with monitoring writes to memory pages. As stated above, only a single entry point exists for entering integrity mode. Because this entry point is assumed to be within the GI driver 108, only GI driver 108 is able to enter integrity mode.

At step 404, GI extension 114 detects whether the hypercall to enter integrity mode is made from an already-registered entry point. If the hypercall was made from such an entry point, then method 400 proceeds to step 408 and if the hypercall was not made from such an entry point, then method 400 proceeds to step 406.

At step 406, because the hypercall was not made from an entry point, GI extension 114 does not allow the VM (or vCPU if the entry point specifies a vCPU) from which the hypercall was made to enter integrity mode. Malicious software might attempt to enter integrity mode, and can attempt to execute a hypercall to do so. Determining whether hypercalls to enter integrity mode are made from an entry point allows GI extension 114 to prevent such malicious software from entering integrity mode. At step 406, GI extension 114 also performs the alert action associated with attempting to enter integrity mode from a location other than the pre-specified entry point. The alert action may be defined by a VM executing in integrity mode and invoking the "set up alert table and global alerts" hypercall described below. After step 406, method 400 ends.

At step 408, because the hypercall was made from an entry point, GI extension 114 allows the VM (or vCPU) from which the hypercall was made to enter integrity mode. In some embodiments, GI extension 114 maintains an indication of whether a particular VM or vCPU is currently in integrity mode. This indication may be stored in virtualization software space 204. As described below, in integrity mode, various "protected" hypercalls can be executed for configuring GI extension 114.

Successfully invoking the enter integrity mode hypercall automatically disables interrupts on the vCPU and returns the value of the interrupt flag (IF) prior to disabling interrupts to GI driver 108 so that the previous interrupt state may be restored. After entering integrity mode, GI driver 108 switches stacks and disables thread rescheduling on the vCPU to prevent thread switches while integrity mode is enabled. Disabling interrupts and disabling thread rescheduling prevents guest OS 106 from pre-empting GI driver 108, which could allow another thread to execute in integrity mode. After disabling thread rescheduling, GI driver 108 restores the saved interrupt flag and proceeds with other hypercalls to access guest integrity services from GI extension 114. The enter integrity mode hypercall does not require the VM to be already executing in integrity mode.

A separate hypercall exists for exiting integrity mode. This hypercall must be called from integrity mode. Attempting to invoke the exit integrity mode hypercall from outside of integrity mode will fail and cause GI extension 114 to perform the pre-defined alert action associated with a hypercall that requires integrity mode not being called from within integrity mode. Once this hypercall is invoked, a vCPU that was executing in integrity mode no longer executes in integrity mode and the hypercalls that require execution in integrity mode may no longer be performed until GI driver 108 next enter integrity mode.

Once integrity mode has been entered, GI driver 108 may successfully invoke various "protected" hypercalls for either monitoring writes to specific memory pages or for protecting GI driver 108 itself. These hypercalls are prevented from being executed outside of integrity mode, to prevent malicious code executing within a VM from modifying, impersonating, or otherwise tampering with the functionality provided by GI driver 108. Some examples of such protected hypercalls include a "write-watch hypercall," which requests GI extension 114 to monitor writes to particular memory pages, a "backdoor message hypercall," which requests GI extension 114 to send a message to security manager 130 via a secure "backdoor" channel, a "gPT watch hypercall," which requests GI extension 114 to monitor guest physical to guest virtual mappings within gPTs 210, an "alert define hypercall," which requests GI extension 114 to define alert actions to be performed in the event of certain violation events occurring, and other hypercalls for initializing or configuring GI driver 108 or GI extension 114. These protected hypercalls are discussed in further detail below.

Figure 5:
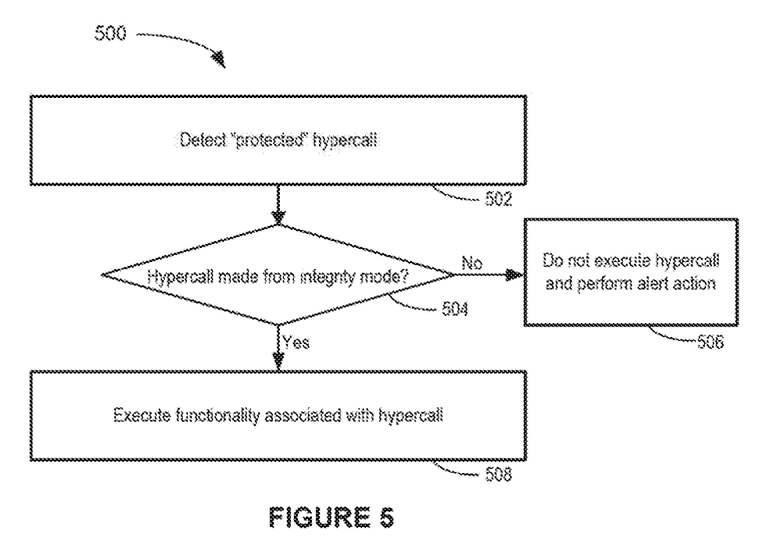
FIG. 5 is a flow diagram of a method for executing protected hypercalls, according to an embodiment.

FIG. 5 is a flow diagram of a method 500 for executing "protected" hypercalls, according to an embodiment. Although described with respect to the system of FIGS. 1 and 2, those of skill in the art will recognize that any system that performs the steps of method 500. In various alternative technically feasible orders, falls within the scope of the present disclosure.

At step 502, GI extension 114 detects invocation of a protected hypercall. As described above, a wide variety of protected hypercalls may be invoked by GI driver 108 while executing in integrity mode. These protected hypercalls provide functionality generally associated with requesting that GI extension 114 monitor memory pages of a VM. These hypercalls are "protected" in the sense that the hypercalls cannot be executed outside of integrity mode.

At step 504, GI extension 114 detects whether the VM or vCPU that invoked the protected hypercall at step 502 is executing in integrity mode. If the VM or vCPU is executing in integrity mode, then method 500 proceeds to step 508 and if the VM or vCPU is not executing in integrity mode, then method 500 proceeds to step 506.

At step 506, GI extension 114 does not execute the hypercall and performs an alert action, such as sending a message to security manager, informing GI driver 108 that a protected hypercall attempted to be executed outside of integrity mode, or suspending the VM from which the protected hypercall was invoked. The alert action to be performed may be a global alert action, defined by a hypercall for defining alerts, described below. Because the hypercall was not made from integrity mode, GI extension 114 determines that executing the hypercall would not be "safe," since that hypercall may have been invoked by malicious code. After step 506, method 500 ends.

If, at step 504, the VM or vCPU that invoked the hypercall was executing in integrity mode, then method 500 proceeds to step 508 instead of step 506. At step 508, GI extension 114 executes the hypercall because the hypercall is invoked from within integrity mode. GI extension 114 deems that execution of this protected hypercall is "safe," because only GI driver 108, and not malicious software, is able to enter integrity mode.

As described above, one of the types of hypercalls that is protected by the integrity mode mechanism is a hypercall to request that GI extension 114 start or stop monitoring writes to specific memory pages. This hypercall is protected so that malicious code cannot change which memory pages are monitored by GI extension 114.

Figure 6:
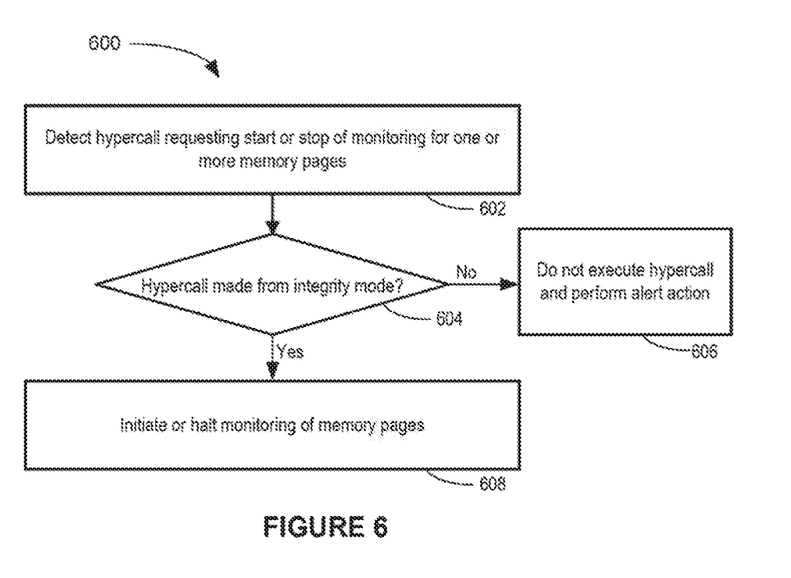
FIG. 6 is a flow diagram of a method for executing a hypercall to initiate or halt monitoring of memory pages, according to an embodiment.

FIG. 6 is a flow diagram of a method 600 for executing a hypercall to initiate or halt monitoring of memory pages, according to an embodiment. Although described with respect to the system of FIGS. 1 and 2, those of skill in the art will recognize that any system that performs the steps of method 600, in various alternative technically feasible orders, falls within the scope of the present disclosure.

GI driver 108 performs method 600 to monitor memory pages specific to GI driver 108 itself including the pages that store the GI driver 108 itself, and the pages that store protection data 122. Protecting these pages allows specified alert actions to be performed if malicious code tampers with the GI driver 108 itself. GI driver 108 also performs method 600 to protect other pages, such as pages that store some of guest OS 106 and/or guest apps 104.

At step 602, GI extension 114 detects a hypercall requesting write monitoring for one or more memory pages of a VM 120. This hypercall may be referred to as a "write-watch hypercall" herein. A write-watch hypercall may request such monitoring to either begin or to end. In some embodiments, a write-watch hypercall specifies pages to watch, or to stop watching, by guest physical page number. The write-watch hypercall also specifies particular actions (also referred to as "alerts") to take upon detecting a write to a monitored page. In some embodiments, these actions are specified on a per-guest-physical-page basis. Thus, different alert actions can be specified for different guest physical pages. In some embodiments, instead of a write-watch hypercall, a read-watch hypercall or simply an access-watch hypercall may be used. A read-watch hypercall requests that reads to a particular page be watched and an access-watch hypercall requests that either type of access (read, write, or execution) be monitored.

At step 604, GI extension 114 determines whether the VM 120 that made the hypercall is executing in integrity mode. If the VM 120 that made the hypercall is executing in integrity mode, then method 600 proceeds to step 608 and if the VM 120 that made the hypercall is not executing in integrity mode, then method 600 proceeds to step 606. At step 606, GI extension 114 does not execute the hypercall and instead performs a global alert action specified in the protection data 122, because the hypercall was not made from integrity mode. After step 606, method 600 ends.

At step 608, because GI extension 114 determines that the hypercall is made from integrity mode, GI extension 114 executes the hypercall to start or stop monitoring for writes to memory pages. For a hypercall that requests that GI extension 114 begin monitoring a particular memory page, GI extension 114 adds a new entry in protection data 122 that indicates a new memory page to be protected as well as what alert actions are to be performed upon determining that a write to that memory page has occurred. GI extension 114 also registers the memory page with a platform tracing service, which executes within VMM 112, and provides the actual memory tracing services. For a hypercall that requests that GI extension 114 stop monitoring a particular memory page, GI extension 114 removes the entry within protection data 122 that corresponds to the memory page for which monitoring is to be stopped. GI extension 114 also unregisters the memory page with the platform tracing service to stop monitoring writes to the memory page. The actions that are taken when a write to a protected memory page is detected are described in greater detail with respect to FIG. 7.

Figure 7:
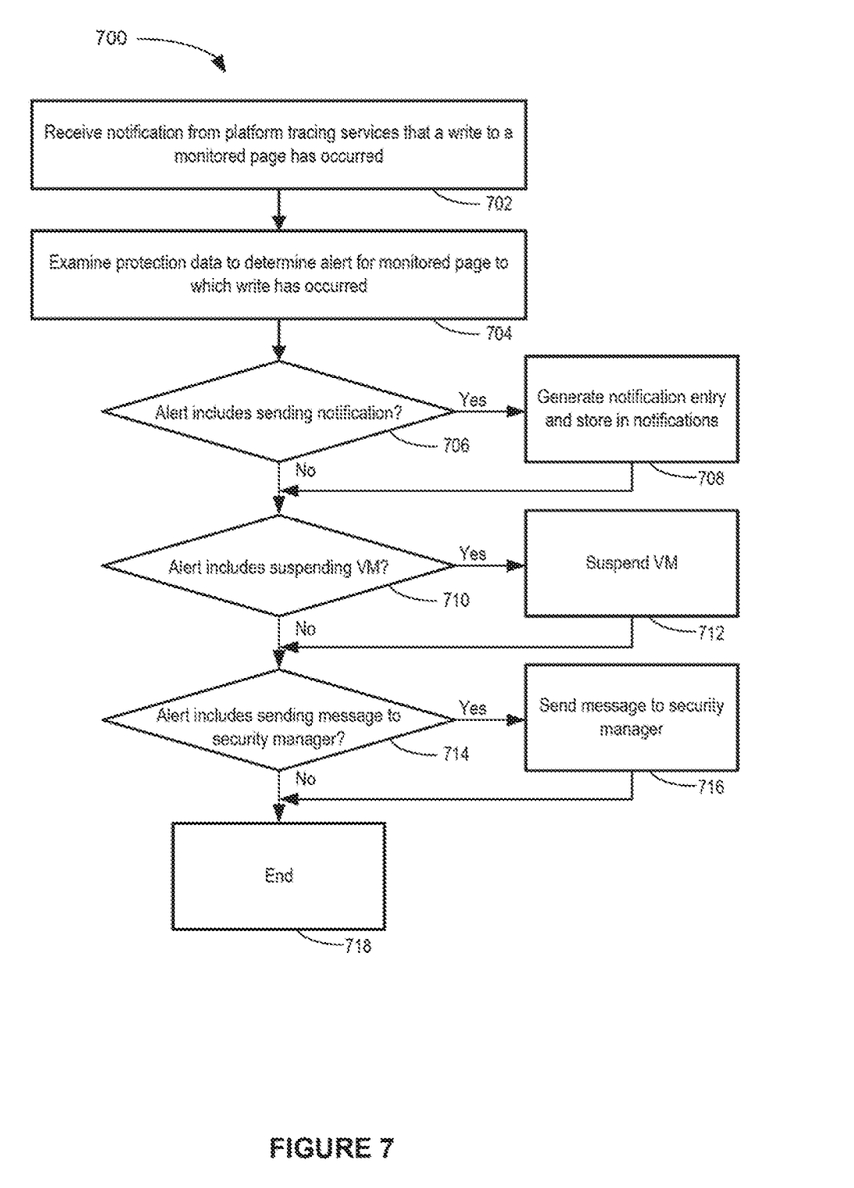
FIG. 7 is a flow diagram of a method for performing actions in response to a write occurring on a monitored memory page, according to an embodiment.

FIG. 7 is a flow diagram of a method 700 for performing actions in response to a write occurring on a monitored memory page, according to an embodiment. Although described with respect to the system of FIGS. 1 and 2, those of skill in the art will recognize that any system that performs the steps of method 700, in various alternative technically feasible orders, fails within the scope of the present disclosure.

As shown, a method 700 begins at step 702, where GI extension 114 receives a notification from platform tracing services that a write to a monitored memory page has occurred. More specifically, upon detecting a write to a memory page, the platform tracing service notifies GI extension 114 that such a write occurs. In some embodiments, the notification provided by the platform tracing service to the GI extension 114 is provided with some delay after the write actually occurs. In some embodiments, the platform tracing service does not prevent the write from occurring but instead detect such a write. In other embodiments, the platform tracing service does prevent the write from occurring.

Various mechanisms exist by which a platform tracing service may detect writes to a memory page. In one example, a processor of host 102 may provide functionality for detecting writes to memory pages registered with the platform tracing service and may notify the platform tracing service upon detecting writes to the registered memory pages. The platform tracing service simply registers one or more memory page with the processor in order to trigger such functionality. In another example, the platform tracing service sets a bit thereinafter referred to as "protection bit") in the protected page's page table entry in the nested page tables 222 or in shadow page tables in embodiments where shadow page tables are used in place of nested page tables 222. In some embodiments, a fault handler is triggered when an access to a protected memory page occurs. The fault handler, included within the platform tracing service, performs steps such as notifying GI extension 114 that the write occurs, or the like. In some embodiments, such notifications occur with a certain amount of delay after the protected access occurs. When GI extension 114 receives a notification that a write occurs on a page for which the protection bit is set, the remaining steps of FIG. 7 are carried out to execute the predefined "alert" for that protected page. In a similar manner, a different (or the same bit) in the protected page's page table entry may be set to track read accesses and execution accesses to that page. Although certain examples of the manner in which tracing functionality can be implemented have been described, those of skill in the art will recognize that other implementations may alternatively be used.

At step 704, GI extension 114 examines protection data 122 to determine one or more alert actions that are to be performed in response to the memory page being written to. Protection data 122 stores indications of such alert actions on a per-page basis, so GI extension 114 determines the alert actions to be performed for the specific memory page that was written to.

At step 706, GI extension 114 determines whether the alert actions include sending a notification to GI driver 108. If the alert actions include sending a notification to GI driver 108, then method 700 proceeds to step 708, and if the alert actions do not include sending a notification to GI driver 108, then method proceeds to step 710. At step 708, GI extension 114 generates a notification entry and stores the notification entry in notification buffer 124 for consumption by GI driver 108. After step 708, method 700 proceeds to step 710.

At step 710, GI extension 114 determines whether the alert actions include suspending a VM. If the alert actions include suspending a VM, then method 700 proceeds to step 712 and if the alert actions do not include suspending a VM, then method 700 proceeds to step 714. At step 712, GI extension 114 suspends the specified VM. After step 712, method 700 proceeds to step 714.

At step 714, GI extension 114 determines whether the alert actions include sending a message to security manager 130, if the alert actions include sending such a message, then method 700 proceeds to step 716 and if the alert actions do not include sending such a message, then method 700 proceeds to step 718. At step 716, GI extension 114 sends a message to security manager 130. After step 716, method proceeds to step 718. At step 718, method 700 ends. Although some example alert actions have been described, other alert actions are possible. In one example, one alert action includes blocking the write.

During operation, GI driver 108 may need to communicate notifications to security manager 130. However, in the event that network drivers of guest OS 106 are compromised. GI driver 108 may not be able to use this "standard" mechanism for communication with security manager 130. Thus a "backdoor" mechanism is provided to allow GI driver 108 to communicate directly with security manager.

This backdoor mechanism is embodied as a hypercall that GI driver 108 may invoke only while executing in integrity mode and that is processed by GI extension 114. Upon detecting that this backdoor message hypercall is invoked, GI extension 114 determines whether the hypercall was made from within integrity mode. If the hypercall was not made from within integrity mode, then GI extension 114 does not execute the hypercall. GI extension 114 examines protection data 122 to determine what alert action is associated with attempting to execute protected hypercalls outside of integrity mode and performs that alert action.

If the backdoor message hypercall is made in integrity mode, then GI extension 114 executes that hypercall. The hypercall specifies an address within guest memory space 205 at which a message exists. GI extension 114 reads the message stored at that address and transmits the message to security manager 130 (FIG. 1). GI extension 114 may utilize networking resources of host 102 to transmit the message to security manager 130.

In addition to requesting that particular physical pages be watched, GI driver 108 may also invoke a hypercall to start watching or stop watching specific guest virtual to guest physical mappings within gPTs 210. The purpose of watching these mappings is to prevent circumvention of the memory page protections described herein by simply modifying the mappings in gPTs 210.

Hypercalls to watch gPT 210 mappings may only be executed in integrity mode. Such hypercalls include, as an argument, an identification of one or more mappings that are to be watched. GI extension 114 detects modifications to watched mappings each time integrity mode is entered. GI extension 114 may also detect modifications to watched mapping when GI driver 108 executes a hypercall that specifically requests GI extension 114 to detect whether modifications to watched mappings have occurred. This additional hypercall must be called in integrity mode. When GI extension 114 receives a hypercall to watch one or more gPT mappings, GI extension 114 records the one or more gPT mappings. Subsequently when either integrity mode is entered or when the specific hypercall to check mappings is invoked, GI extension 114 checks the recorded mappings against the mappings actually stored in the guest page tables and performs an alert action specified in protection data 122 if GI extension 114 determines that a mapping has been altered.

Additional hypercalls exist for identifying, to GI extension 114, which memory location within protection data 122 is to be used for an alert table, and for defining alert actions in that alert table. These hypercalls must be executed in integrity mode. Defining alert actions involves defining global alert actions as well as defining entries in the alert table for non-global events. Global alert actions define specific alert actions that GI extension 114 takes responsive to particular "global" events occurring. Global alert actions are stored in protection data 122. Global events include detecting a hypercall made from outside of integrity mode, attempting to enter integrity mode from a point other than the properly set entry point, and other events that may be considered to be an "error." Non-global events are stored as entries in an alert table within protection data 122 that associate specific watched memory pages with specific alert actions to take when writes to those pages are detected. Actions that can be taken include writing a notification into notification buffer 124, sending a message to security manager 130, or suspending the VM.

Hypercalls also exist to initialize protection data 122 and initialize notification buffer 124. These hypercalls inform GI extension 114 which pages in guest memory space 205 store protection data 122 and notification buffer 124. In some embodiments, these hypercalls cause GI extension 114 to begin write-monitoring the memory pages storing the protection data 122 and notification buffer 124 (and thus GI driver 108 does not need to separately request write monitoring of these memory pages). These hypercalls can only be called from integrity mode. A hypercall also exists for informing GI extension 114 that an entry in notification buffer 124 has been consumed. This hypercall must be executed in integrity mode. Because notification buffer 124 is in guest memory space 205, GI driver 108 may access notification buffer 124 directly.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for protecting memory of a virtual computing instance executing within a host computer, the method comprising:
   receiving a first request, from a component executing within the virtual computing instance, to protect a first memory page;
   determining, by examining a privilege mode of the virtual computing instance, that the component is permitted to make the first request;
   protecting the first memory page by updating a data structure that tracks protected memory pages thereby defining a first protected memory page;
   detecting a write to the first protected memory page;
   responsive to the detecting, identifying an alert action for the first protected memory page; and
   performing the alert action.

2. The method of claim 1, further comprising:
   receiving a second request, from the virtual computing instance, to remove protection from a second memory page;

determining, by examining the privilege mode of the virtual computing instance, that the component is not permitted to make the first request; and responsive to the determining, performing an alert action instead of executing the second request.

3. The method of claim 1, wherein protecting the first memory further comprises:

using a trace service to install a trace on the first memory page, wherein the trace service transmits a notification to an abstraction layer supporting execution of the virtual computing instance, upon detecting the write to the first memory page.

4. The method of claim 1, wherein:

the first memory page stores instructions of the component.

5. The method of claim 1, wherein:

the first memory page is stored within a memory space assigned to the virtual computing instance; and the first memory page stores at least one of:

at least a portion of the data structure that tracks protected memory pages, a c write notifications for retrieval by the component.

6. The method of claim 1, further comprising:

receiving an indication from a trace service that the first memory page has been written to;

responsive to receiving the indication, looking up an alert action associated with the memory page; and performing the alert action, wherein the alert action comprises one of: transmitting a notification to the component that the first memory page has been written to, suspending the virtual computing instance, and sending a message to a security monitor that is external to the virtual computing instance.

7. The method of claim 1, further comprising:

receiving a second request, from the component, that defines a message that is stored in a memory space assigned to the virtual computing instance and that is to be transmitted to a security manager that is external to the virtual computing instance;

determining, by examining the privilege mode of the virtual computing instance, that the component is permitted to make the second request; and executing the second request by reading the message from the memory space assigned to the virtual computing instance and transmitting the message to the security manager that is external to the virtual computing instance.

8. The method of claim 1, further comprising:

receiving a second request, from the component; to enter the privilege mode;

determining that second request is made from a registered entry point; and causing the virtual computing instance to enter the privilege.

9. The method of claim 8, further comprising:

receiving a third request to register the entry point;

determining that the entry point has not yet been set; and executing the third request to set the entry point.

10. The method of claim 1, wherein:

the alert action comprises at least one of:

transmitting a write notification indicating that the first protected memory page was written to, to the component, suspending execution of the virtual computing instance, and transmitting a write notification indicating that the first protected memory page was written to, to a security manager that is external to the virtual computing instance.

11. A system for protecting memory of a virtual computing instance, the system comprising:

a host computer;

an abstraction layer executing within the host computer;

the virtual computing instance, supported by the abstraction layer; and a component executing within the virtual computing instance, wherein the abstraction layer is configured to:

receive a first request, from the component, to protect a first memory page, determine, by examining a privilege mode of the component, that the component is permitted to make the first request, protect the first memory page by updating a data structure that tracks protected memory page thereby defining a first protected memory page, detect a write to the first protected memory page, responsive to the detecting, identify an alert action for the first protected memory page, and perform the alert action.

12. The system of claim 11, wherein the abstraction layer is further configured to:

receive a second request, from the virtual computing instance, to remove protection from a second memory page;

determine, by examining the privilege mode of the virtual computing instance, that the virtual computing instance is not permitted to make the first request; and responsive to the determining, performing an alert action instead of executing the second request.

13. The system of claim 11, wherein the abstraction layer is configured to protect the first memory page by:

using a trace service to install a trace on the first memory page, wherein the trace service transmits a notification to the abstraction layer upon detecting the write to the first memory page.

14. The system of claim 11, wherein:

the first memory page stores instructions of the component.

15. The system of claim 11, wherein:

the first memory page is stored within a memory space assigned to the virtual computing instance; and the first memory page stores at least one of:

at least a portion of the data structure that tracks protected memory pages, and write notifications for retrieval by the component.

16. A non-transitory computer-readable medium storing instructions that, when executed by a processor, cause the processor to perform a method for protecting memory of a virtual computing instance executing within a host computer, the method comprising:

receiving a first request, from a component executing within the virtual computing instance; to protect a first memory page;

determining, by examining a privilege mode of the virtual computing instance, that the component is permitted to make the first request;

protecting the first memory page by updating a data structure that tracks protected memory pages thereby defining a first protected memory page;

detecting a write to the first protected memory page;

responsive to the detecting, identifying an alert action for the first protected memory page; and performing the alert action.

17. The non-transitory computer-readable medium of claim 16, wherein the method further comprises:

receiving a second request, from the virtual computing instance, to remove protection from a second memory page;

determining, by examining the privilege mode of the virtual computing instance, that the component is not permitted to make the first request; and responsive to the determining, performing an alert action instead of executing the second request.

18. The non-transitory computer-readable medium of claim 16, wherein protecting the first memory further comprises:

using a trace service to install a trace on the first memory page, wherein the trace service transmits a notification to a abstraction layer supporting execution of the virtual computing instance, upon detecting the write to the first memory page.

19. The non-transitory computer-readable medium of claim 16, wherein:

the first memory page stores instructions of the component.

20. The non-transitory computer-readable medium of claim 16, wherein:

the first memory page is stored within a memory space assigned to the virtual computing instance; and the first memory page stores at least one of:

at least a portion of the data structure that tracks protected memory pages, and write notifications for retrieval by the component.

\* \* \* \* \*